United States Patent [19]

Smith

[11] 4,273,524

[45] Jun. 16, 1981

[54] PLATEN TYPE MOLDING PRESS

[75] Inventor: John A. Smith, Cinnaminson, N.J.

[73] Assignee: Hull Corporation, Hatboro, Pa.

[21] Appl. No.: 952,496

[22] Filed: Oct. 18, 1978

[51] Int. Cl.³ .............................................. B29F 1/00
[52] U.S. Cl. .............................. 425/450.1; 425/451.2; 425/451.5; 425/451.9; 425/589; 425/590; 425/593; 425/595; 425/DIG. 223; 425/DIG. 221
[58] Field of Search ............... 425/450.1, 451.2, 451.5, 425/451.6, 451.7, 451.9, DIG. 220, DIG. 222, DIG. 221, DIG. 223, 589, 590, 593, 595

[56] References Cited

U.S. PATENT DOCUMENTS

| | | | |
|---|---|---|---|
| 2,718,662 | 9/1955 | Bohannon et al. | 425/DIG. 223 |
| 3,156,014 | 11/1964 | Wenger | 425/DIG. 223 |
| 3,191,235 | 6/1965 | Rougement | 425/451.2 X |
| 3,262,158 | 7/1966 | Von Reimer et al. | 425/451.2 |
| 3,263,277 | 8/1966 | Ohlendorf et al. | 425/451.2 |
| 3,270,372 | 9/1966 | Hesse | 425/451.2 |
| 3,376,607 | 4/1968 | Brown | 425/398 X |
| 3,452,399 | 7/1969 | Blumer | 425/451.2 |
| 3,577,596 | 5/1971 | Bullard | 425/DIG. 223 |
| 3,604,058 | 9/1971 | Fischbach | 425/DIG. 223 |
| 3,669,599 | 6/1972 | Snider et al. | 425/595 |
| 3,687,590 | 8/1972 | Cyriax | 425/444 X |
| 3,716,323 | 2/1973 | Classen | 425/451.2 |
| 3,799,728 | 3/1974 | Howard | 425/451.2 X |
| 4,032,277 | 6/1977 | Linde et al. | 425/451.2 X |
| 4,038,003 | 7/1977 | Hansson | 425/451.2 X |
| 4,088,432 | 5/1978 | Farrell | 425/451.6 |

*Primary Examiner*—J. Howard Flint, Jr.
*Attorney, Agent, or Firm*—Oliver D. Olson

[57] ABSTRACT

In a molding press having fixed and movable platens for mounting mold halves, the movable platen is connected through thrust rods and a thrust plate to the movable component of an hydraulic piston-cylinder platen drive unit the fixed component of which is attached to a fixed base. A high pressure piston-cylinder mold clamping unit of the pancake type interengages the movable platen and a pancake cylinder support plate mounted for movement along the thrust rods and arranged for abutment by the thrust plate. The pancake cylinder support plate and fixed base are joined together by toggle joints operated by a piston-cylinder locking unit supported pivotally on arms extending pivotally from the pancake cylinder support plate and fixed base. The drive unit thus is arranged in parallel with the series arrangement of the toggle joints and mold clamping unit.

5 Claims, 4 Drawing Figures

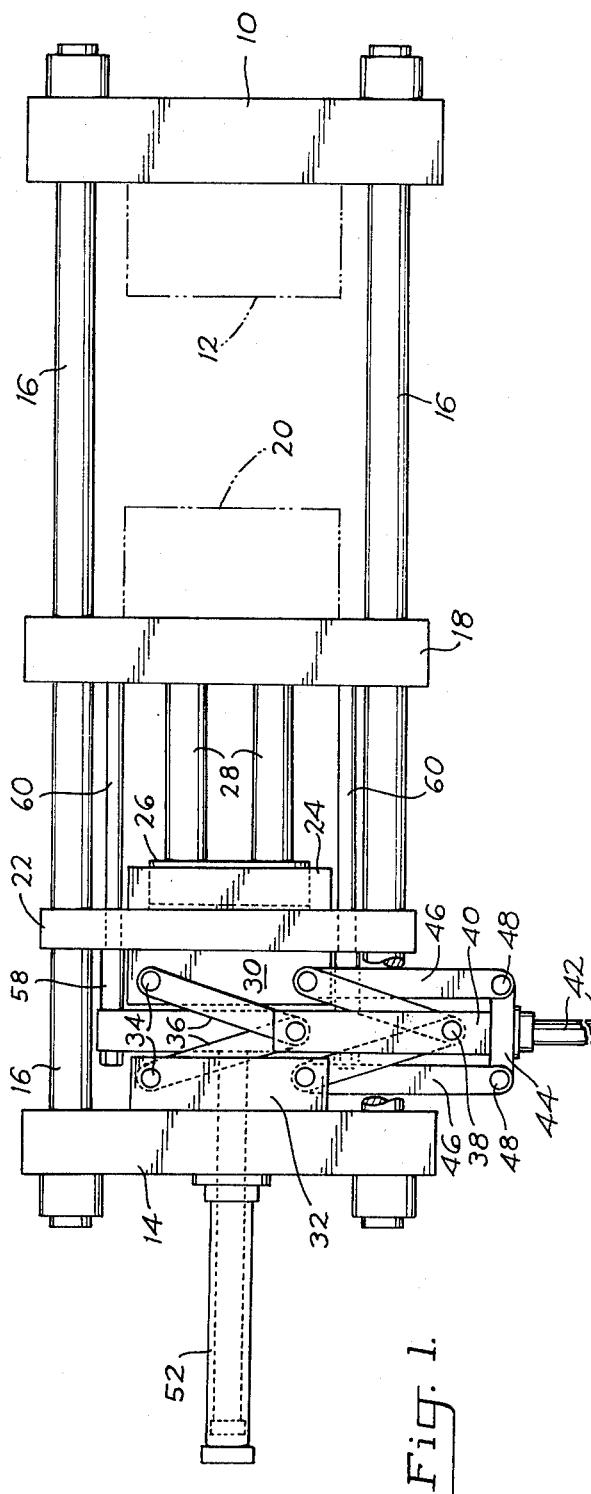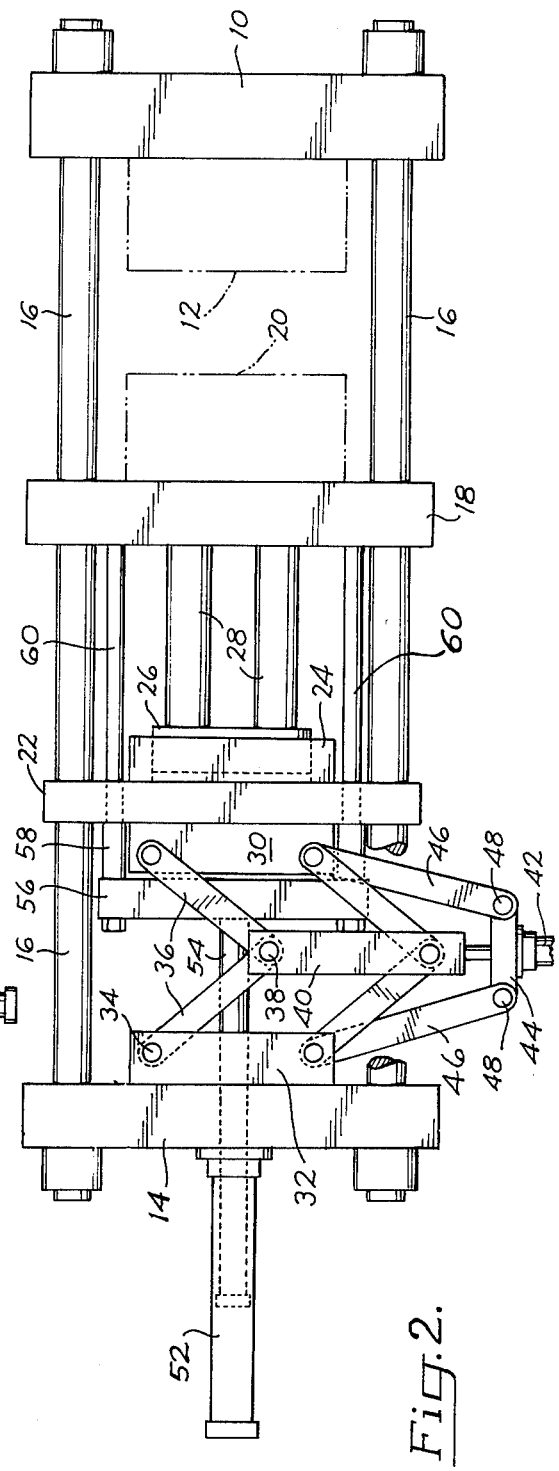

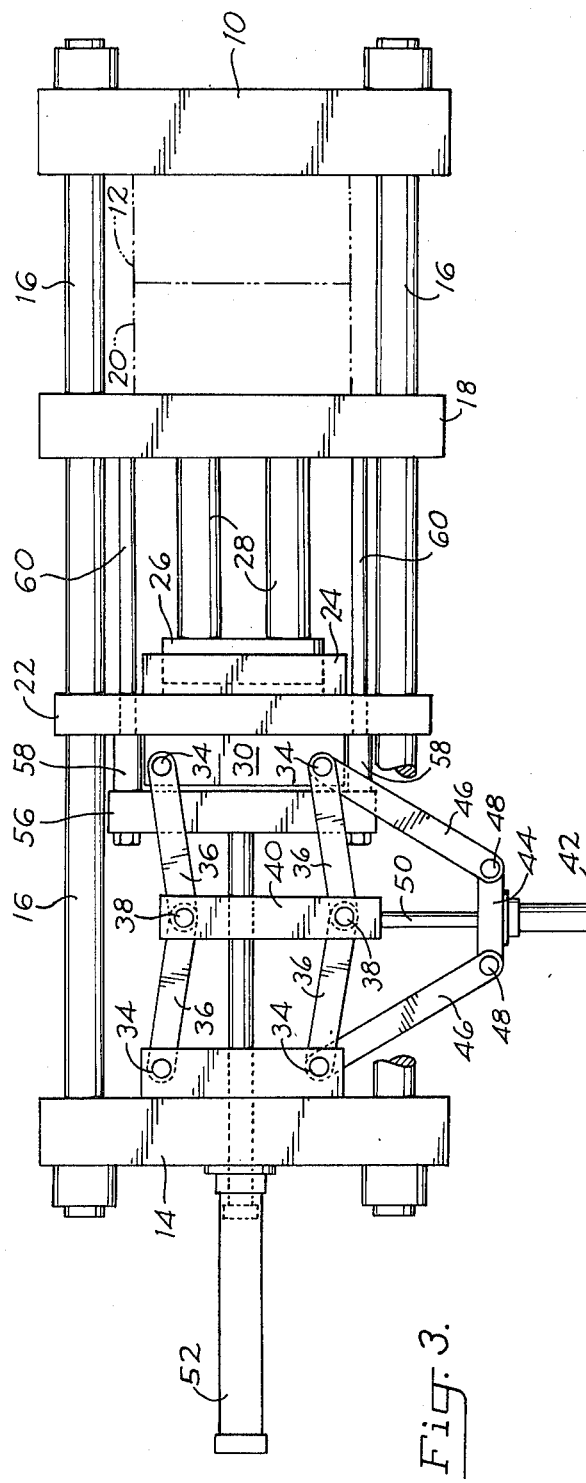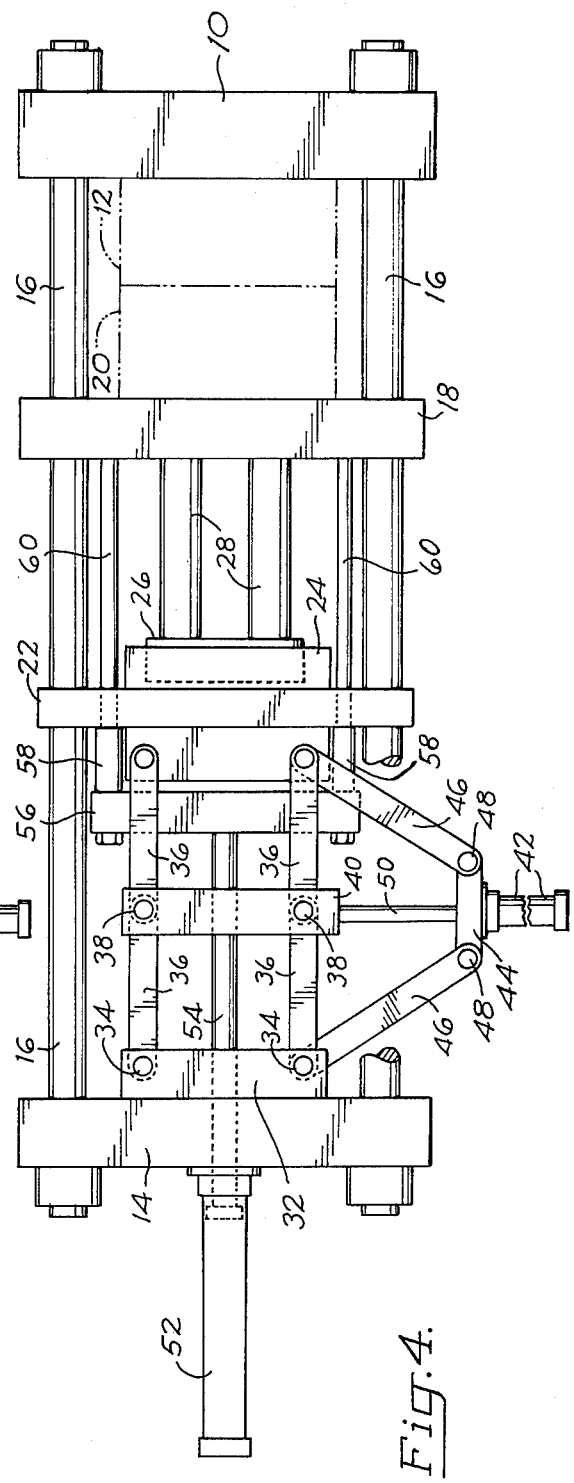

PLATEN TYPE MOLDING PRESS

BACKGROUND OF THE INVENTION

This invention relates to molding presses, and more particularly to mechanism for opening and closing the molds of a molding press.

In transfer and injection molding of synthetic thermosetting and thermoplastic resins, rubber and other elastomers, die cast and other materials, the presses must furnish a clamping force greater than the force created by the transferring or injecting of materials into the closed mold. The created force depends upon the size of the mold, the number of mold cavities, the material being transferred or injected and the transfer or injection pressure being used. These pressures created within the mold, trying to force it open, vary from a few tons to several thousand tons.

Pressures of these magnitudes have been accommodated in molding presses heretofore by mold closing mechanisms the structures of which present certain limitations and disadvantages. Typical of these prior structures is a molding press in which the movable mold platen is moved between open and closed position by toggle joints operated by a piston-cylinder unit and pivotally interconnecting a fixed base and a movable pancake cylinder support plate. A pancake type clamping cylinder interengages its support plate and the movable mold platen to provide final high pressure for closing the mold. This structural arrangement seriously limits the extent of opening of the mold, thereby rendering difficult and more time consuming the clearing and maintenance of the mold sections. It also requires the piston-cylinder unit for the toggle joints to provide considerable power, and therefore the closing movement of the mold is correspondingly slowed. This is reflected in a longer molding cycle.

SUMMARY OF THE INVENTION

In its basic concept, the platen type molding press of this invention utilizes an extensible platen drive mechanism in parallel with the series arrangement of extensible locking and mold clamping mechanisms.

It is by virtue of the foregoing basic concept that the principal objective of this invention is achieved; namely, to overcome the aforementioned disadvantages and limitations of prior mold opening and closing mechanisms.

Another objective of this invention is the provision in a platen type molding press mold opening and closing mechanism which enables opening of the mold to a substantially greater degree than has been afforded heretofore.

Still another objective of this invention is the provision in a platen type molding press mold opening and closing mechanism which affords considerably faster movement of the movable mold section than has been afforded heretofore.

A further objective of this invention is the provision in a platen type molding press of mold opening and closing mechanism provided with maximum mold protection control.

A still further objective of this invention is the provision of mold opening and closing mechanism of the class described which is of simplified construction and is readily adaptable for integration with conventional platen type molding presses.

The foregoing and other objects and advantages of this invention will appear from the following detailed description, taken in connection with the accompanying drawings of a preferred embodiment.

BRIEF DESCRIPTION OF THE DRAWINGS

FIGS. 1, 2, 3, and 4 are fragmentary views in side elevation of a platen type molding press incorporating mold opening and closing mechanism embodying the features of this invention, FIG. 1 showing the component arrangement with the molds fully opened, and FIGS. 2, 3 and 4 showing the component arrangements as the mold sections are moved progressively to the fully closed position of FIG. 4.

DESCRIPTION OF THE PREFERRED EMBODIMENT

The drawings illustrate certain basic components of a conventional platen type molding press with which the mold opening and closing mechanism of this invention may be integrated. Thus, there is shown a fixed platen 10 adapted to support a fixed mold section 12, and a stationary base 14 spaced longitudinally from but adjustable toward and away from the fixed platen. A plurality of elongated guide rods 16 are supported by and extend between the fixed platen and stationary base. As illustrated, there are four such guide rods arranged adjacent the four corners of the rectangular fixed platen and stationary base.

A movable platen 18 is provided with transverse openings for the reception of the guide rods which thus support the movable platen for longitudinal movement toward and away from the fixed platen. The movable platen is arranged to mount a movable mold section 20 for cooperative association with the fixed mold section.

Located between the movable platen and the stationary base and supported by the guide rods for longitudinal movement thereon is a clamp cylinder support plate 22. On the side of this plate facing the movable platen is secured the cylinder 24 of an extensible piston-cylinder mold clamping unit. As illustrated, this unit is of the pancake cylinder type. The piston 26 projects from the cylinder and a plurality of piston rods 28 extend from the piston into attached engagement with the movable platen.

On the opposite face of the support plate 22, i.e. the face confronting the stationary base 14, there is secured a vertically elongated bracket 30. A pair of such brackets 32 are mounted in laterally spaced relationship on the confronting face of the stationary base. These brackets 30 and 32 serve to support pivot shafts 34 which mount the outer ends of elongated bars 26 which are arranged in pairs to form a plurality of toggle joints. The inner, lapped ends of the bars of each pair are connected together pivotally by a pivot shaft 38 which extends between a pair of laterally spaced connector plates 40.

In the embodiment illustrated, there are upper and lower toggle joints interconnected by the plates 40 for simultaneous operation by an extensible hydraulic piston-cylinder unit. As illustrated, the cylinder 42 of the unit is secured to a base 44 supported by a pair of arms 46 which are secured at one end to the base 44 by means of pivot shafts 48. The opposite end of one of the arms is secured to a pivot shaft 34 carried by the bracket 32 on the stationary base 14. The corresponding end of the other arm is secured to the pivot shaft 34 carried by the bracket 30 on the support plate 22. The projecting end of the piston rod 50 associated with the cylinder 42 is connected to the pivot shaft 38 carried by the plates 40 and joining the lapped ends of the lower toggle joint bars 36.

The foregoing structural arrangement comprises the essential components of a typical form of molding press. The movable platen is moved between open and closed positions, by appropriate application of hydraulic fluid under pressure to the toggle cylinder 42. This cylinder performs the dual function of a platen drive cylinder and a mold locking cylinder. Thus, when the piston rod of the toggle cylinder has been extended to the mold locking position illustrated in FIG. 4, wherein the toggle joints are fully straightened between the stationary base 14 and the support plate 22, the mold section 20 carried by the movable platen will have been brought into closed position against the confronting surface of the mold section 12 carried by the fixed platen. High clamping pressure then is supplied to the mold by application of high pressure hydraulic fluid to the clamping cylinder 24.

Opening of the mold is achieved by relieving the high pressure hydraulic fluid in the clamping cylinder and then applying high pressure hydraulic fluid to the toggle cylinder 42 in the direction to retract the associated piston rod 50 and collapse the toggle joints. However, the extent of such collapse of the toggle joints is limited substantially to the arrangement illustrated in FIG. 2. This limitation severely restricts the degree of opening of the mold, as evidenced by a comparison of FIGS. 1 and 2.

In accordance with this invention, means is provided for moving the movable mold section 20 between closed, but unclamped position relative to the fixed mold section 12, and the fully retracted position of FIG. 1. In the embodiment illustrated, this means is provided by an extensible hydraulic piston-cylinder platen drive unit. One component of the unit, the elongated cylinder 52 in the embodiment illustrated, is secured at the piston rod end thereof to the stationary base 14. The piston rod 54 of the unit extends freely througgh an opening in the base 14 and is connected at its outer end to a thrust plate 56. Secured to the thrust plate and extending therefrom freely through aligned openings in the support plate 22 and stabilizer bosses 58, are a plurality of elongated thrust rods 60. The forward ends of the thrust rods are secured to the movable platen 18. Thus, the platen drive unit 52, 54 extends between the stationary base 14 and movable platen 18 in parallel with the series-connected assembly of clamping cylinder 24-28 and toggle joints operated by toggle cylinder 42.

It is to be noted, from a comparison of FIGS. 1 and 2 that the platen drive cylinder 52 enables complete collapse of the toggle joints and correspondingly greater separation of the movable mold from the fixed mold, in the fully opened condition of the press. This greater "daylight" condition between the fixed and movable mold sections greatly facilitates clearing of mold pieces from the mold and also maintenance and repair of the mold components.

The operation of the press described hereinbefore is as follows: Assuming the press components are in the positions illustrated in FIG. 1, i.e. in the fully opened condition of the press, hydraulic pressure is removed from the pancake cylinder 24 and toggle cylinder 42 and hydraulic pressure is applied to the platen drive cylinder 52 in the direction to extend the piston rod 54 toward the right in the drawings. The thrust plate 56 and thrust rods 58, together with the attached movable platen 18, are moved quickly toward the right to the position illustrated in FIG. 3. In this position the movable mold section 20 is brought into positive, but low pressure abutment with the fixed mold section 12.

During movement of the thrust plate 56 toward the right, it abuts the bosses 58 associated with the pancake cylinder support plate 22, and thus moves the latter and pancake cylinder with it toward the right.

The mold sections having been closed under the relatively low pressure of the platen drive cylinder 52, hydraulic pressure is applied to the toggle cylinder 42 in the direction to extend the piston rod 50 and move the toggle joints from the slightly collapsed condition of FIG. 3 to the straight, locked condition of FIG. 4. For this purpose the magnitude of hydraulic pressure required for the toggle cylinder need only be sufficient to move the toggle joints to the locking position of FIG. 4.

With the toggle joints held in locking position, the pancake cylinder then is activated by high hydraulic pressure to apply high clamping force to the movable platen and hence to the movable mold section. This clamping force is maintained during transfer or injection of appropriate material into the cavities of the mold.

When it is desired to open the press, the high clamping pressure is removed from the pancake cylinder and hydraulic pressure is applied to the toggle cylinder 42 in the direction to retract the toggle joints from the locked position of FIG. 4 to the partially collapsed condition for FIG. 3, after which the retracting pressure may be removed. Hydraulic pressure then is applied to the platen drive cylinder 52 in the direction to retract the piston rod 54 toward the left, until the press components have returned to the positions illustrated in FIG. 1.

It will be appreciated that since the platen drive cylinder is arranged in parallel with the series arrangement of the pancake cylinder and toggle joints operated by the toggle cylinder, opening and closing of the press is achieved by the platen drive cylinder independently of the operation of the pancake cylinder and toggle cylinder. However, in the event of malfunctioning of the platen drive cylinder, the press still may be operated under emergency condition by utilizing the toggle cylinder as a platen drive cylinder, as in the manner of the prior art described hereinbefore.

Of considerable importance in the present invention is the increased speed with which the mold may be opened and closed by operation of the platen drive cylinder 52. These linear movements of the platen drive cylinder are faster than the movements of the toggle joints by operation of the toggle cylinder 42. Accordingly, the molding time cycle and cost of production are correspondingly decreased.

Also of importance in the present invention is the minimization of the size of the toggle cylinder 42 and platen drive cylinder 52 and the corresponding volume of hydraulic fluid required for their operation. This minimizes the size and cost of hydraulic pumps and electric drive motors. It has been found that these factors contribute beneficially to reducing the electric horsepower requirement by about one-half.

Further, since the platen drive cylinder functions to close the mold prior to actuating the toggle cylinder and the clamping cylinder, maximum mold protection control with minimum timing mechanism is achieved.

It will be apparent to those skilled in the art that various changes may be made in the size, shape, type, number and arrangement of parts described hereinbefore. For example, the connections of the hydraulic piston-cylinder units to the associated components may be reversed. Extensible power drive mechanisms, such as electrically or hydraulically driven rack and pinion mechanisms, may replace the hydraulic piston-cylinder units illustrated, although the latter are preferred for their versatility, power capabilities and speed of operation. The thrust plate 56 may be supported by the guide rods 16 for longitudinal reciprocation. The foregoing and other changes may be made, as desired, without departing from the spirit of this invention.

Having now described my invention and the manner in which it may be used, I claim:

1. In a platen type molding press having fixed and movable platens mounting mold components, the movable platen being mounted on guide rods extending between the fixed platen and a stationary base, a series-connected assembly of extensible platen drive and locking mechanism and extensible mold clamping mechanism interengaging the stationary base and the movable platen, the drive mechanism being operable to move the movable platen between a retracted, mold-open position for removing molded components therefrom and an extended position in which the mold component mounted on said movable platen is in a mold-closed position closed against the mold component mounted on the fixed platen and locked releasably against retraction from said mold-closed position, and the extensible mold clamping mechanism being operable to apply high clamping pressure to the mold component on the movable platen, the combination therewith of a second extensible platen drive mechanism connected between the stationary base and movable platen in parallel with said series-connected drive and locking mechanism and mold clamping mechanism for moving the movable platen between said extended, mold-closed position and a second retracted, mold-open position in which the mold component mounted on said movable platen is spaced from the mold component on the fixed platen a distance greater than the first mentioned retracted, mold-open position afforded by the first named platen drive and locking mechanism.

2. The combination of claim 1 wherein the series-connected assembly comprises an extensible piston-cylinder mold clamping unit having one end engaging the movable platen, and an extensible piston-cylinder platen drive and locking unit interengaging the stationary base and the end of the clamping unit opposite the platen-engaging end, and the second drive mechanism comprises an extensible piston-cylinder platen drive unit interengaging the stationary base and movable platen.

3. The combination of claim 2 wherein one of the piston and cylinder of the second platen drive unit is secured to the stationary base, a movable thrust member engages the other of the piston and cylinder of the second thrust drive unit, and a plurality of thrust rods on the thrust member engage the movable platen.

4. The combination of claim 3 wherein a clamping unit support member is mounted on the thrust rods for movement thereon and supports the end of the clamping unit opposite the end engaging the movable platen.

5. The combination of claim 4 wherein the platen drive and locking unit includes a toggle joint the outer ends of which are connected pivotally one to the stationary base and the other to the clamping unit support member, the intermediate pivot being connected pivotally to one of the piston and cylinder of the platen drive and locking unit, and support arms pivotally interconnect the other of the piston and cylinder of the platen drive and locking unit and the stationary base and clamping unit support member.

* * * * *